(No Model.) 2 Sheets—Sheet 1.
C. C. PECK.
PROCESS OF PURIFYING WATER.
No. 394,208. Patented Dec. 11, 1888.
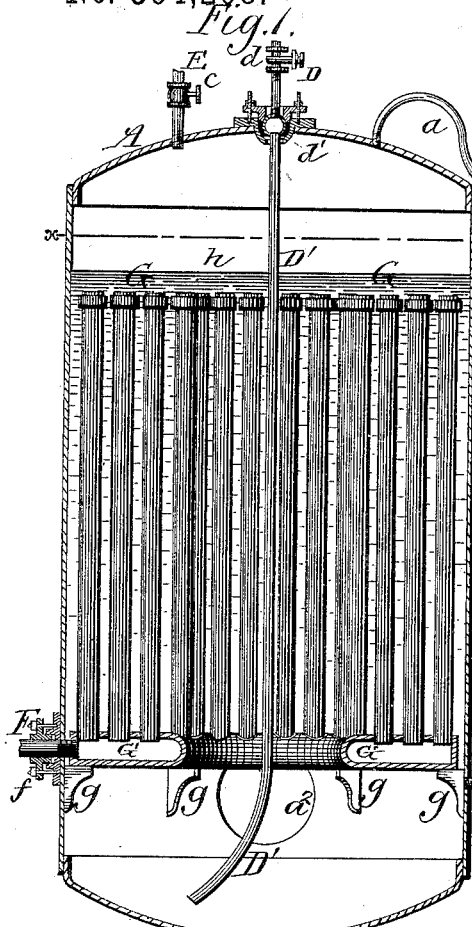
Fig. 1.
Fig. 2.
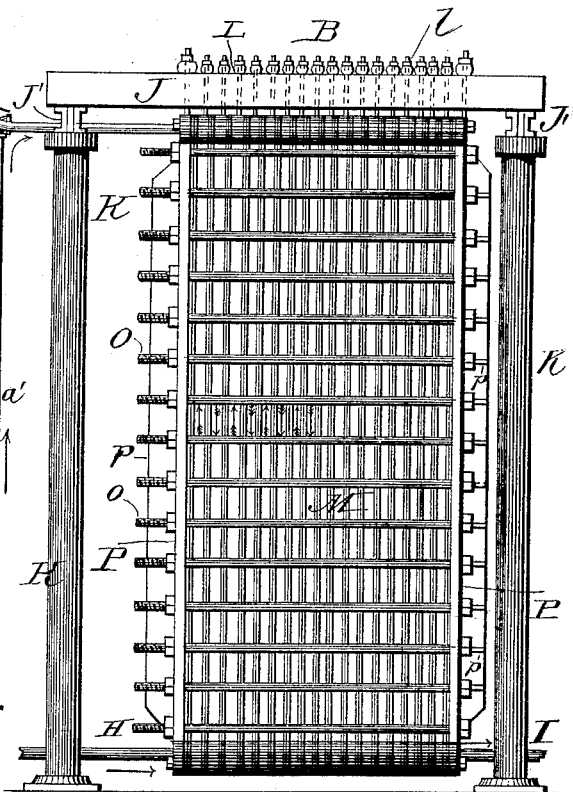
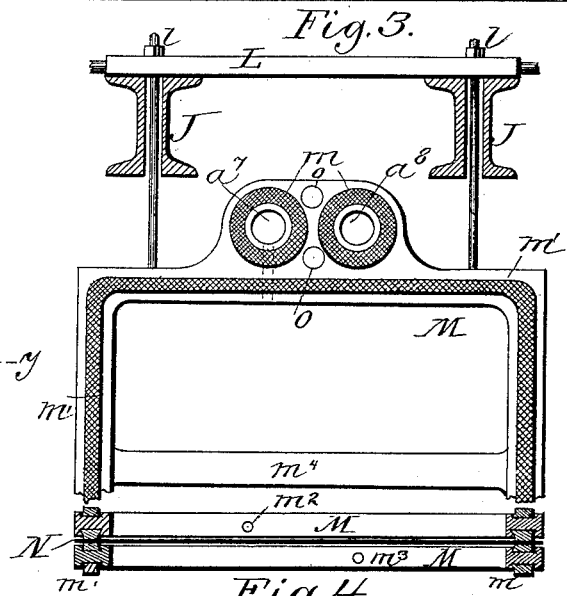
Fig. 3.
Fig. 4.
Witnesses:
William E. Hiller
George T. Monroe
Inventor,
Cassius C. Peck.

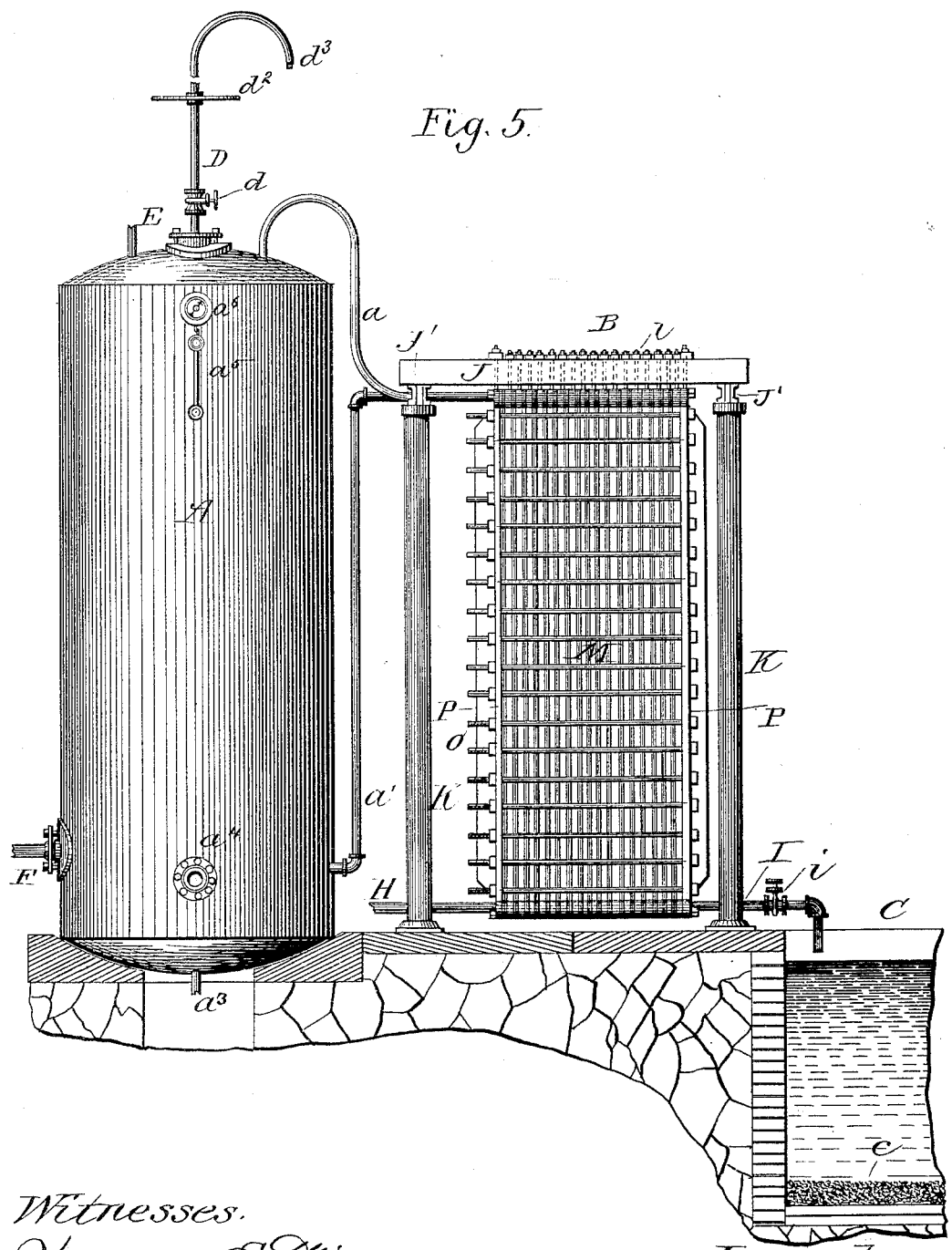

UNITED STATES PATENT OFFICE.

CASSIUS CARROLL PECK, OF NEW YORK, N. Y.

PROCESS OF PURIFYING WATER.

SPECIFICATION forming part of Letters Patent No. 394,208, dated December 11, 1888.

Application filed January 30, 1888. Serial No. 262,448. (No model.)

*To all whom it may concern:*

Be it known that I, CASSIUS CARROLL PECK, a citizen of the United States, residing in the city, county, and State of New York, have invented a certain new and Improved Process of Purifying Water and other Liquids; and I do hereby declare that the following is a full, clear, and exact description of the invention, which will enable others skilled in the art to which it appertains to make use of the same.

The object of my invention is to purify water, so as to better prepare it for domestic and manufacturing uses and for employment in steam-boilers, by removing such solid matters as are held in suspension and also such as are held in solution, but which assume solid forms upon being subjected to the degree of heat commonly present in steam-boilers, the same process being also applicable to the purification of other liquids in which solids held in solution can be precipitated on being subjected to a temperature above their boiling-points. The process is especially adapted for employment on a large scale, as in supplying towns and cities with water, the purification of brine in the manufacture of salt, the purification of cane and beet juice in the manufacture of sugar, and in cleansing water for use in locomotives and other steam-boilers.

The process consists of three principal steps—namely, heating the water or other liquid above its boiling-point to cause the precipitation of such solid matter as it contains, either in solution or suspension, which can be thus precipitated; second, in cooling to the temperature of the feed-water the water which has been heated and by means of the supply which replaces the water which leaves the heater, and, third, removal by means of one or more settling-reservoirs of solid matter from the water which has been heated and then cooled.

In my patent, No. 373,802, dated November 22, 1887, a somewhat similar process is described, the most apparent difference between the present and the aforesaid invention consisting in removal of precipitated matter from water which has been heated and then cooled by depositing it at the bottom of a reservoir instead of separating it by means of a filter. This difference, however, is very important, as it not only enables the process of purification to be carried on with less labor and expense, but it also effects a new result in causing a more complete separation of the solid and the liquid constituents. As stated in the patent referred to, water which has been heated to about the temperature of 300° Fahrenheit and then cooled and immediately filtered under considerable pressure through a suitable medium will be mostly freed of such substances as prove injurious in boilers, and for most other uses, such as sulphates and carbonates of magnesia, alumina, sodium, lime, iron, &c. Since filing the application for the above-mentioned patent I have made an important discovery in relation to the action of heat in throwing down solid matter from solutions. This is, that a high degree of heat causes the aggregation and deposition of solid particles held in suspension when the water is allowed to subsequently cool and remain quiet for a number of hours, and thus purifies it to a greater extent than can be effected by filtering while hot or immediately after cooling.

It is well known that temperatures above the boiling-point have the effect of driving off or dissociating acid from salts of lime, magnesia, &c., held in solution, thereby transforming said salts into the solid form; but I am not aware that the remarkable effect of temperatures considerably above the boiling-point has previously been observed or recorded in connection with the assembling together and throwing to the bottom of minute particles held in suspension.

The accompanying drawings show apparatus suitable for use in conducting my process of purifying water and other liquids, although I do not confine myself to the specific apparatus herein described, as varying conditions of use require modifications of apparatus without departing from the essential features of the invention.

In the drawings, Figure I is a central vertical section of the heating-chamber through plane of broken line *y y*, Fig. II, together with a side elevation of the combined heater and cooler, which, for the sake of distinction and clearness in description, I shall term the "cooler." Fig. II is a top or plan view of the heater through plane of broken line x x, Fig. I, being designed to show the arrangement of the heating-pipes and the header in which they are secured. Fig. III is a front elevation of the upper end of one of the cooler-frames, showing also the manner in which the frame is suspended. Fig. IV is a cross-section of two of the cooler-frames, showing also the thin metal sheet which is interposed between each two frames, as also the packing employed to form a tight joint between the frames and the metal sheet. Fig. V is a side elevation of both the heating-chamber and the cooler, together with a section of a reservoir for receiving and settling the water after treatment.

The heating-chamber A consists of a strong metallic shell with arched heads or ends, in the lower one of which is a blow-off pipe, $a^3$, and in the upper end a vapor-escape pipe, E, and a liquid-supply pipe, $a$. In the sides of the shell are a liquid-discharge pipe, $a'$, and a steam-supply pipe, F, also a pipe, D, having a lower curved portion, D'. The use of this pipe is to discharge sediment which collects from time to time in the bottom of chamber A, and for this purpose it swings freely in all directions upon the steam-tight ball-joint $d'$, and the discharge is controlled by gate-valve $d$. Steam-pipe F passes through a stuffing-box, $f$, on shell A and enters header G' of heater G, which latter consists of forty pipes screwed or otherwise secured with steam-tight joints in the header. The heating-chamber is also supplied exteriorly with a sight-hole, $a^4$, glass water-gage $a^5$, and steam-gage $a^6$. The cooler is composed of a number of metal frames, as M, Figs. III and IV, having a sheet of thin metal interposed between each two frames and a liquid-tight joint formed between said sheet and each frame by means of rubber, woven hemp, or other equivalent elastic packing, $m'$. Each frame is supported by two rods, $l$, attached to a cross-bar, L, Figs. I and III, which is sustained by channel-bars J, which rest upon similar cross-bars, J', these latter being carried by posts K.

The lower ends of frames M are formed like the upper ends, as shown in Fig. III. There are two continuous passages, $a^7 a^8$, through the tops of all the frames and corresponding passages through the lower ends of the frames, the joints between the several frames being made tight by elastic packing, $m$, bearing against metallic sheets N, Fig. IV. At right angles to the aforesaid passages each frame has a much smaller passage, $m^2 m^3$, at the top and also at the bottom, which communicate with either one or the other of the large passages $a^7 a^8$. The use of the several passages will appear best in describing the operation of the apparatus in carrying on the process. The several frames constituting the series are bound tightly together by means of tie-rods O, the thrust of which is taken by heavy cast heads P, which are strengthened by a central rib, $p$, and transverse ribs $p'$, Fig. I. Into the lower end of one head is secured liquid-supply pipe H, which communicates with the passage $a^7$ in the lower end and the upper end of the frames, and thus with pipe $a$. In like manner discharge-pipe I connects with passages $a^8$ and pipe $a'$. This latter pipe delivers the liquid under treatment, after being heated and cooled, into reservoir C. The small holes $o$ in the frames (shown in Fig. III) are for the passage of tie-rods.

The operation of the process is as follows: Supply-pipe H is connected with a suitable head obtained by means of a force-pump or equivalent, and water or other liquid to be treated is forced into the passage in the lower end of cooler B, corresponding to $a^7$, (shown in Fig. III,) and thence through holes $m^2$ in frames M into the space bounded by the edges of each frame and the metallic sheets N, and passes upward to corresponding small exit-holes, $m^2$, in the frames to passage $a^7$ and pipe $a$, which latter delivers it into chamber A. Only every alternate frame communicates with passage $a^7$ by holes $m^2$, and the feed-liquid therefore occupies only each alternate frame or the space inclosed by the frame. A liquid-level is maintained in heating-chamber A at about line $h$ by admitting a fresh supply of liquid as fast as a corresponding amount is allowed to flow out. Steam is admitted to header G' and heating-pipes G through pipe F, and the process of heating the liquid in the chamber goes on as long as may be necessary to cause the solid matter to separate from the liquid-vehicle. While the heating proceeds a certain amount of vapor is allowed to escape through pipe E in order to carry off gaseous products evolved from the water or other liquid—such as air, carbonic-acid gas, &c.—and also, in many cases, for the purpose of concentrating the liquid. In the precipitation of carbonates and sulphates held in solution acid gases are rapidly formed, and if provision were not made for discharging these, together with air thrown off by the liquid, from the chamber the effectiveness of the process would be impaired. In the case of brine used for manufacturing salt it is desirable that it should be brought to a full degree of saturation before it leaves the chamber, as sulphate of lime, which is one of the most troublesome products in making salt, is largely precipitated in advance of chloride of sodium. The liquid requires in all cases to be heated above its boiling-point, and in the case of water or brine a temperature of about 300° Fahrenheit should be employed to insure the precipitation of the sulphate of lime and other sulphates, and such temperature is also more effective than lower temperatures in causing the precipitation of earthy and other matters held in suspension. When higher heat than 300° is employed, somewhat shorter time may be allowed for retaining the liquid in chamber A. No fixed length of time can be named for keeping the liquid heated, as this will depend upon the nature of the liquid and its constituents and the degree of purification required, so that the variation may be as much as from ten minutes to ten hours. The best arrangement is to provide a continuous flow of liquid through chamber A by admitting a stream of feed-liquid through pipe $a$ equal in amount to one passing out of the chamber through pipe $a'$. The cubical contents of the chamber divided by the volume of liquid passing through the chamber will give approximately the time during which the liquid passing out of the chamber has been heated. To insure an even distribution throughout the chamber of the liquid as it enters, a better arrangement than shown is to have the delivery made at four or more points in the head or at the sides of the shell, and the liquid may also be drawn away from the chamber at a similar number of points; but for the sake of simplicity only one point each of delivery and exit are shown in the drawings. After passing out of chamber A through pipe $a'$ the liquid flows through passage $a^8$ in the upper end of cooler B and downward through every alternate frame M by holes $m^3$, thence out from the space inclosed by the edges of the frames and metal sheets N through holes in the lower ends of the frames corresponding to holes $m^3$ at the top into a like passage, as shown at $a^8$, Fig. III, by which the liquid is conducted to discharge-pipe I, which delivers it into the settling basin or reservoir C. Here the liquid will usually remain from one to three days, although a greater or a less length of time may be given for deposit of solid matter upon the floor of the reservoir, as indicated at $c$, depending upon the character of the substances held in suspension or solution and upon the degree of purification desired. A good way of constructing a subsidence basin is to so arrange it that the liquid shall flow into it at one end or side and out at the opposite end or side. In this way a continuous supply of purified liquid may be drawn from said basin or reservoir; also, more than one reservoir may be employed, as when it is important to purify the liquid as much as possible, or in order to prevent interruption of the process, one reservoir being cleaned while another is in use.

Heating of the liquid-supply for chamber A and simultaneous cooling of liquid-discharge from said chamber are effected by conducting the two currents, separated by only thin metallic walls N, in opposite vertical directions through cooler B, as indicated by arrows in Fig. I, the feed-liquid from pipe H flowing upward through each alternate division formed by the frames of the cooler and gradually exchanging temperatures with the discharge-liquid from pipe $a'$, which flows downward through each alternate division formed by the several frames M which compose the cooler. If the cooler is properly proportioned—that is, if there is a sufficient amount of the thin metal surface N to effect a complete exchange of temperatures and if the size of passages $a^7$ $a^8$ $m^2$ $m^3$ is properly proportioned—the feed-liquid, which enters the cooler at its lower end in a comparatively cold state, will, by the time it has reached the top of the cooler, have nearly attained the temperature of the liquid flowing out of chamber A by pipe $a'$ and downward through each alternate division of the cooler to discharge-pipe I, and the latter current of liquid will in its passage through the cooler have given off its excess of heat to the feed-liquid and will reach pipe I cooled to nearly the temperature of the entering feed-liquid. There are other forms of cooler in which this method of exchange of temperatures by conducting currents in opposite directions can be effected, this particular form being shown as a convenient one for obtaining a large amount of heating and cooling surface in compact shape and as affording accessibility for cleaning. All parts of the cooler can be reached by unscrewing the nuts on bolts O and removing said bolts, so that the frames M can be slid apart from each other on supporting-bars T.

In treating most liquids more or less sediment will be deposited in the bottom of chamber A. Without stopping the purifying process this can be removed as it occurs by means of pipe D D', as by opening gate-valve $d$ the pressure of vapor in the chamber will force out through the pipe the mixed liquid and solid contents of said chamber. The ball-joint $d'$ enables the pipe D' to be swung about so as to reach every portion of the bottom of the chamber. Hand-wheel $d^2$ is of assistance in swinging the pipe, and the goose-neck $d^3$ is convenient in attaching a hose-pipe or in directing the discharge of refuse to a suitable place of disposal.

For convenience in managing the apparatus globe or gate valves will usually be placed in pipes $a$ and $a'$. A valve, $c$, in pipe E controls the discharge of vapor and gases from heating-chamber A, and a similar valve on pipe F is required for regulating the supply of steam to header G' and heating-pipes G. A valve is also required on blow-off pipe $a^3$.

An important feature in connection with the action of heat in causing the precipitation of solid matter held in solution or suspension, but more especially in the former condition, is the time required to effect the complete deposition of the substance acted upon. If water containing earthy salts in solution and earthy matter in suspension, after being heated for a convenient length of time— say from fifteen minutes to three hours—at a temperature of 300° Fahrenheit or at a pressure of fifty-five to sixty pounds above that of the atmosphere, be immediately filtered in the most thorough manner, this same water on being allowed to subsequently stand undisturbed for some hours will be found to have deposited a certain amount of solid material on the bottom of the vessel in which it is held; but the deposit will be greatest if the water has been filtered while hot. Now, if the water had not been filtered after being heated, but had been allowed to stand perfectly quiescent for a number of hours, it would have deposited nearly all the contained solid matter on the bottom of the vessel in which it rested and could be drawn off more completely freed of such matter than it would be by the other method immediately after filtering.

The action of temperatures above the boiling-point in causing the subsidence of suspended matter appears to be somewhat similar to that of certain salts, as those of alumina and iron. It induces an aggregation or massing of particles, and the density of the mass causes it to sink. In the case of organic substances the effect produced is no doubt largely due to coagulation; but with inorganic substances the assembling and precipitation of minute particles cannot be so easily explained, and it is not necessary for the present purpose to go beyond the well-ascertained fact that temperatures considerably in excess of the boiling-point are very effective in throwing down suspended matter, as well as that held in solution. The two steps then of heating considerably above the boiling-point of the liquid under treatment and of subsequent settling while in a cool state are essential to the effectiveness of the process; and the interchange of temperatures between the feed-liquid and the discharge-liquid is essential to the practical and economical conduct of the process on an ordinary working scale, while the three steps constitute an efficient and economical process for purifying water and other liquids on a large scale.

Having thus fully described the nature and operation of the process, what I claim, and desire to secure by Letters Patent, is—

The process hereinbefore described of purifying water and other liquids, consisting in first heating the liquid considerably above its boiling-point, then cooling it by causing it to impart its excess of heat to the feed-liquid, which is made to move in opposite direction to the liquid which passes away from the heater, and, lastly, separating solid matter from the liquid by subsidence, substantially in the manner and for the purpose described.

CASSIUS CARROLL PECK.

Witnesses:
L. B. PECK,
W. L. DeGRAW.